(12) United States Patent
Perdue

(10) Patent No.: US 8,025,343 B1
(45) Date of Patent: Sep. 27, 2011

(54) WHEEL WHICH PRODUCES AN ECCENTRIC VISUAL EFFECT

(76) Inventor: Jesse T. Perdue, Erin, TN (US)

( * ) Notice: Subject to any disclaimer, the term of this patent is extended or adjusted under 35 U.S.C. 154(b) by 20 days.

(21) Appl. No.: 12/660,835

(22) Filed: Mar. 5, 2010

Related U.S. Application Data

(63) Continuation-in-part of application No. 12/459,077, filed on Jun. 29, 2009, now Pat. No. 7,901,012.

(51) Int. Cl.
*B60B 19/00* (2006.01)
(52) U.S. Cl. .................. 301/5.1; 301/95.109; D12/208
(58) Field of Classification Search .................. 301/5.1, 301/5.301, 5.309, 63.101, 63.106, 64.203, 301/64.707, 95.109; D12/204, 208, 212; 295/1, 6, 21
See application file for complete search history.

(56) References Cited

U.S. PATENT DOCUMENTS

| | | | | |
|---|---|---|---|---|
| 1,593,238 A | * | 7/1926 | Basler | 16/45 |
| 5,647,642 A | * | 7/1997 | Word | 301/5.21 |
| 6,663,190 B2 | * | 12/2003 | Kashiwai et al. | 301/63.101 |
| 7,901,012 B1 | * | 3/2011 | Perdue | 301/5.1 |

* cited by examiner

*Primary Examiner* — Jason Bellinger
(74) *Attorney, Agent, or Firm* — Norman B. Rainer

(57) ABSTRACT

A metal wheel which produces an unusual visual effect when rotated employs a disc member extending between a center hub and outermost rim in angular relationship to the wheel's axis of rotation. The rim is provided with a continuously varied weighting feature to neutralize the centrifugal imbalance that would otherwise be produced.

9 Claims, 4 Drawing Sheets

WHEEL WHICH PRODUCES AN ECCENTRIC VISUAL EFFECT

RELATED APPLICATIONS

This application is a continuation-in-part application of application Ser. No. 12/459,077, filed Jun. 29, 2009, now U.S. Pat. No. 7,901,012.

BACKGROUND OF THE INVENTION

1. Field of the Invention

The present invention relates to wheels for vehicles intended for outdoor use upon roadways and pathways, and more particularly concerns wheels which support resilient tires as employed by motorized vehicles.

2. Description of the Prior Art

It is well known that wheels can impart desirable aesthetic effects to the vehicle with which they are associated. In the case of automobiles and trucks, decorative hub caps are often removably emplaced upon the center portion of the wheel that includes an axle which secures the wheel. In other instances, the entire central portion of the wheel structure, extending from the centered axle to the outer perimeter or tire-mounting rim may be of a specialized design having high aesthetic appeal.

In many instances, the wheel design is intended to be attractive particularly when the vehicle is motionless. However, wheel designs are also employed wherein a special visual effect is produced during motion of the vehicle. Such movement effects usually employ a hub cap that rotates by inertial action. However, wheels which contain interactive moving components may have durability limitations and may present safety concerns.

U.S. Pat. No. 7,901,012 relates to a wheel which produces a novel eccentric visual effect upon rotation. However, its specialized construction presents fabrication difficulties. In particular, it is not amenable to fabrication by casting or hot shaping techniques generally employed for the manufacture of wheels for automotive vehicles.

It is accordingly an object of the present invention to provide a wheel which will provide an unusual visual effect.

It is a further object of this invention to provide a wheel as in the foregoing object which secures a resilient tire.

It is a still further object of the present invention to provide a wheel of the aforesaid nature intended for use on vehicles such as automobiles and motorcycles.

It is an additional object of this invention to provide a wheel of the aforesaid nature amenable to fabrication by way of metal casting methods.

These objects and other objects and advantages of the invention will be apparent from the following description.

SUMMARY OF THE INVENTION

The above and other beneficial objects and advantages are accomplished in accordance with the present invention by a metal wheel of monolithic construction having opposed sides of equal diameter and comprised of:
a) a hub having a centered axis of rotation, and provided with means for releasable attachment to an axle of a wheeled vehicle,
b) a disc member extending outwardly from said hub to a substantially circular outer boundary and centered upon a plane which intersects said axis at an angle between 47 and 87 degrees,
c) a rim member of generally circular configuration centered upon said axis and bounded in part by oppositely spaced apart side panels in substantially orthogonal relationship to said axis and embracing a circular cylindrical interior surface that joins with the outer boundary of said disc member as a continuous integral extension thereof while positioning said outer boundary to associate with said side panels at diametrically opposed distal sites, and an exterior surface surrounding said interior surface and having means for the mounting of a rubber tire, and
d) a continuously variable balancing zone bounded in part by said interior and exterior surfaces and having a radially measured thickness that progressively varies in the axial direction, the smallest thickness being associated with said distal sites,
e) said interior and exterior surfaces having linearly translatable configurations without re-entrant features.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
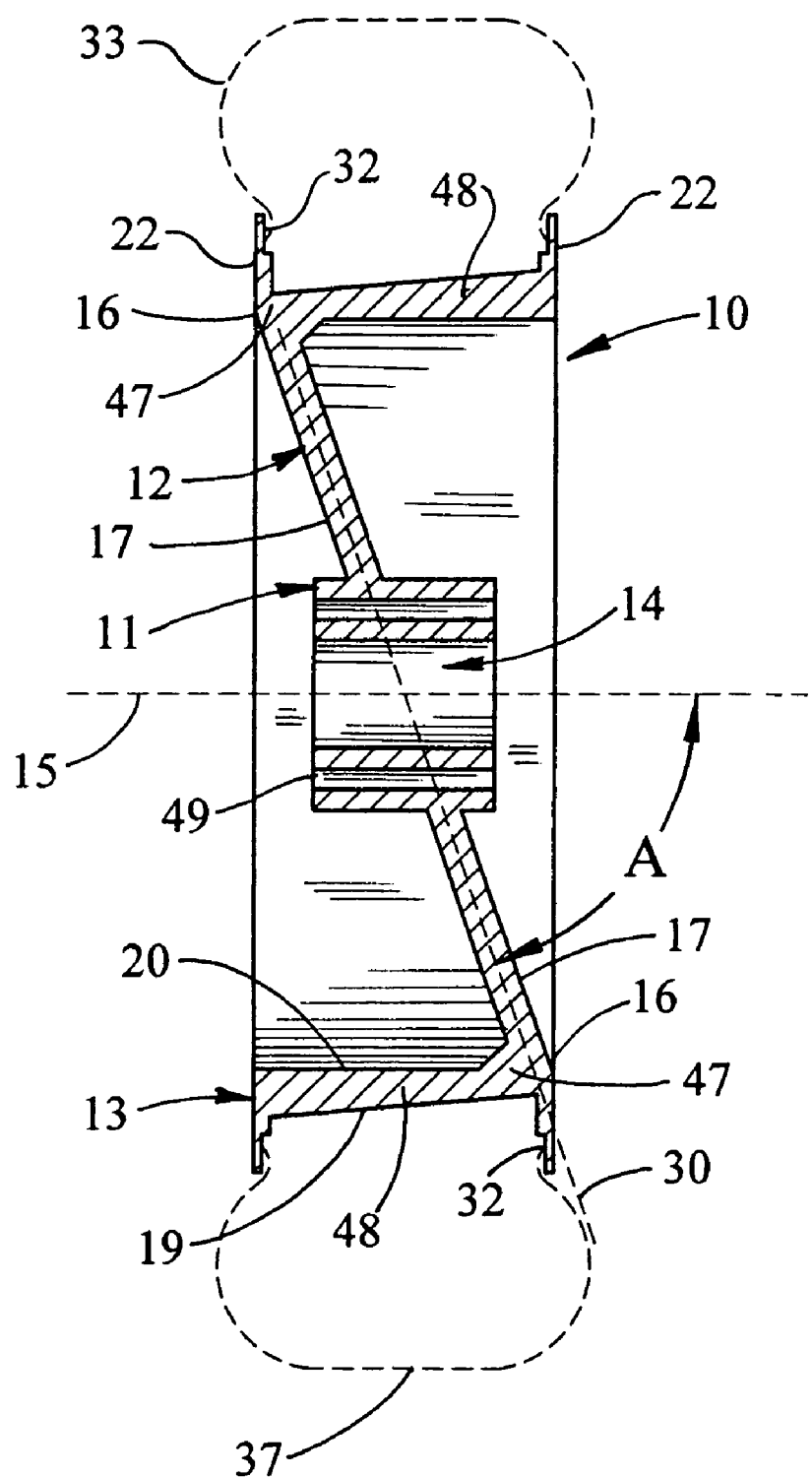
FIG. 1 is a vertical sectional view of an embodiment of the wheel of the present invention, shown in association with a tire in phantom outline.

Referring now to FIGS. 1-4, an embodiment of the wheel 10 of the present invention is shown comprised of disc member 12, rim member 13, and hub 11 having bore 14 centered upon axis 15. Said several components of the wheel are shown as a single monolithic metallic shape produced by a molding operation, and wherein both opposed sides of the wheel are of identical but inverted appearance.

Hub 11 has means for securing the wheel onto an axle which may provide rotary driving force. Such axle, not a part of this invention, may be associated, for example, with a motor vehicle such as an automobile, motorcycle, truck, wagon or trailer. Suitable securing means may be in the form of a plurality of axially-directed bolt-accommodating bores 49 which can be drilled through the hub following the molding operation. Said bolts would align with bolt-receiving holes in a conventional flange secured to such axle. Other axle-securing means may, however by employed, especially with a motorcycle axle.

Disc member 12 extends outwardly from its emergence from hub 11, terminating in a substantially circular outer boundary 16. Said disc member is centered upon plane 30 that intersects axis 15 at an acute angle A of between 47 and 87 degrees. The smaller angles within such range apply to golf cart type wheels which are of small diameter and have a relatively wide rim or tread. Said disc member is further bounded by opposed surfaces 17, which may be flat or contoured.

Rim member 13 is bounded in part by circular cylindrical interior surface 20 and exterior surface 19, both surfaces centered upon axis 15, and further bounded by oppositely spaced apart side panels 22 disposed in substantially orthogonal relationship to axis 15. Interior surface 20 integrally merges with the outer boundary 16 of said disc member and positions said outer boundary to associate with said side panels at diametrically opposed distal sites 47. The width of said rim member, measured laterally between side panels 22 is constant throughout the perimeter of the rim member. Whereas interior surface 20 has a circular cylindrical shape, exterior surface 19 has a precisely twisted configuration which serves to controllably vary the thickness of the intervening annular zone of metal 48 embraced by said interior and exterior surfaces. Specifically, the radially measured thickness of zone 48 progressively varies in the axial direction, the smallest thickness being associated with the aforesaid distal sites where disc member 12 contacts or most closely approaches a side panel 22. Such variable thickness of zone 48 neutralizes centrifugal imbalances caused by the angled nature of disc member 12. In the absence of said balancing feature, the wheel would vibrate with an intensity that would increase with the rotational speed of the wheel.

Although the wheel, when viewed in horizontal side profile, has a lopsided appearance, it is perfectly balanced with respect to centrifugal effect about axis 15. During travel, the rotating wheel presents an extremely unusual eccentric or wobble effect which simulates the appearance of a wheel about to dislodge from its supporting axle. The unusual visual effect can be further enhanced by complimentary indicia placed upon surfaces 17 of the disc member.

Exterior surface 19 has associated tire mounting means comprised of opposed abutment flanges 32 adapted to interact with the bead portion of rubber tires. Said tire mounting means may be adapted to accommodate either a tubeless or tube-equipped tire 33 whose outermost tread 37 surrounds the wheel.

Said interior and exterior surfaces, 20 and 19, respectively, have linearly translatable configurations having no re-entrant features. Such configurations enable the wheel to be cast from molten metal employing mold components which can be pulled straight away from the cast wheel.

Figure 2:
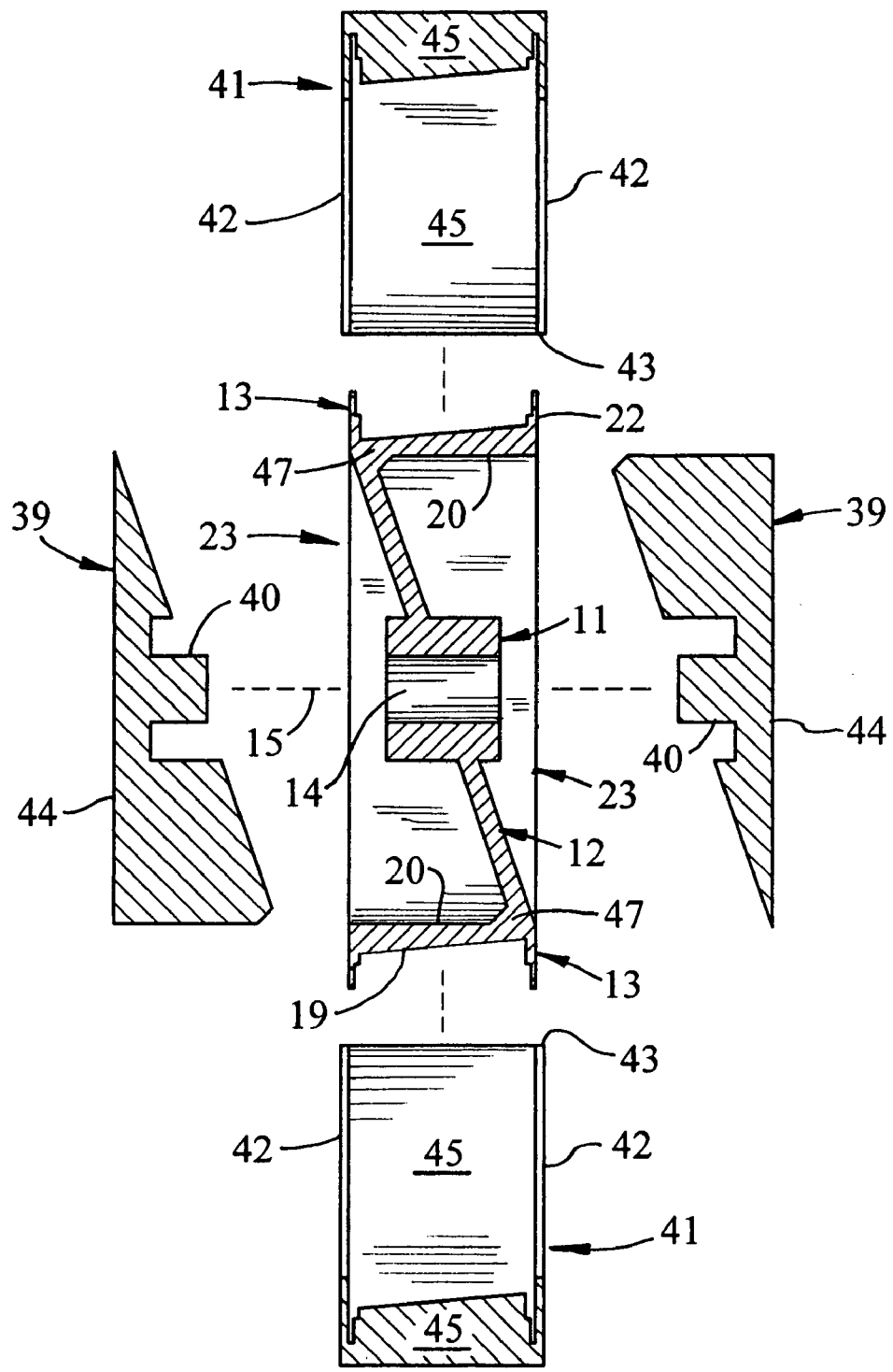
FIG. 2 is a sectional view as in FIG. 1 shown in association with mold components used for the production of the wheel by way of a casting operation.
Figure 3:
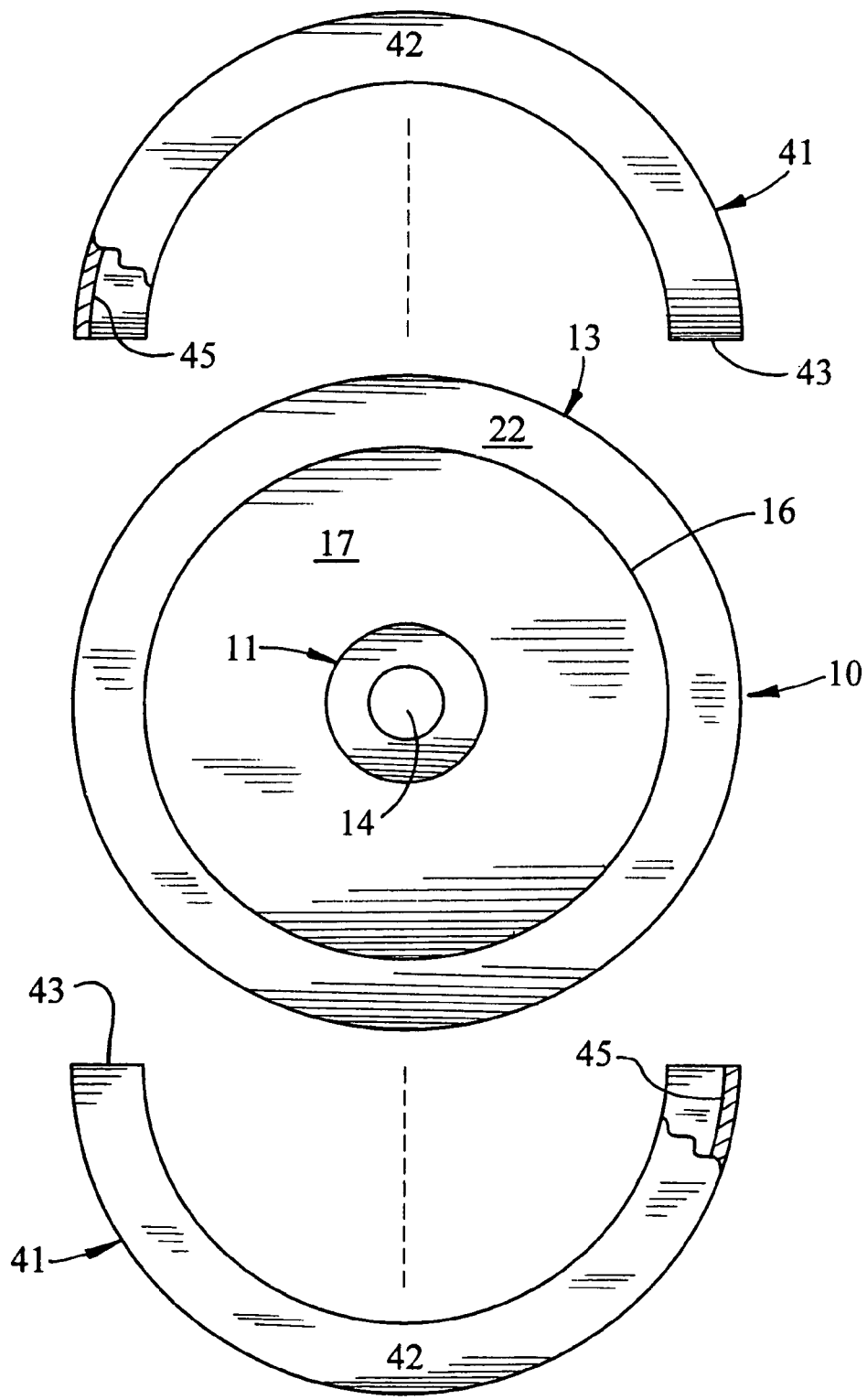
FIG. 3 is a side view of the embodiment of FIG. 1 with partial mold components.
Figure 4:
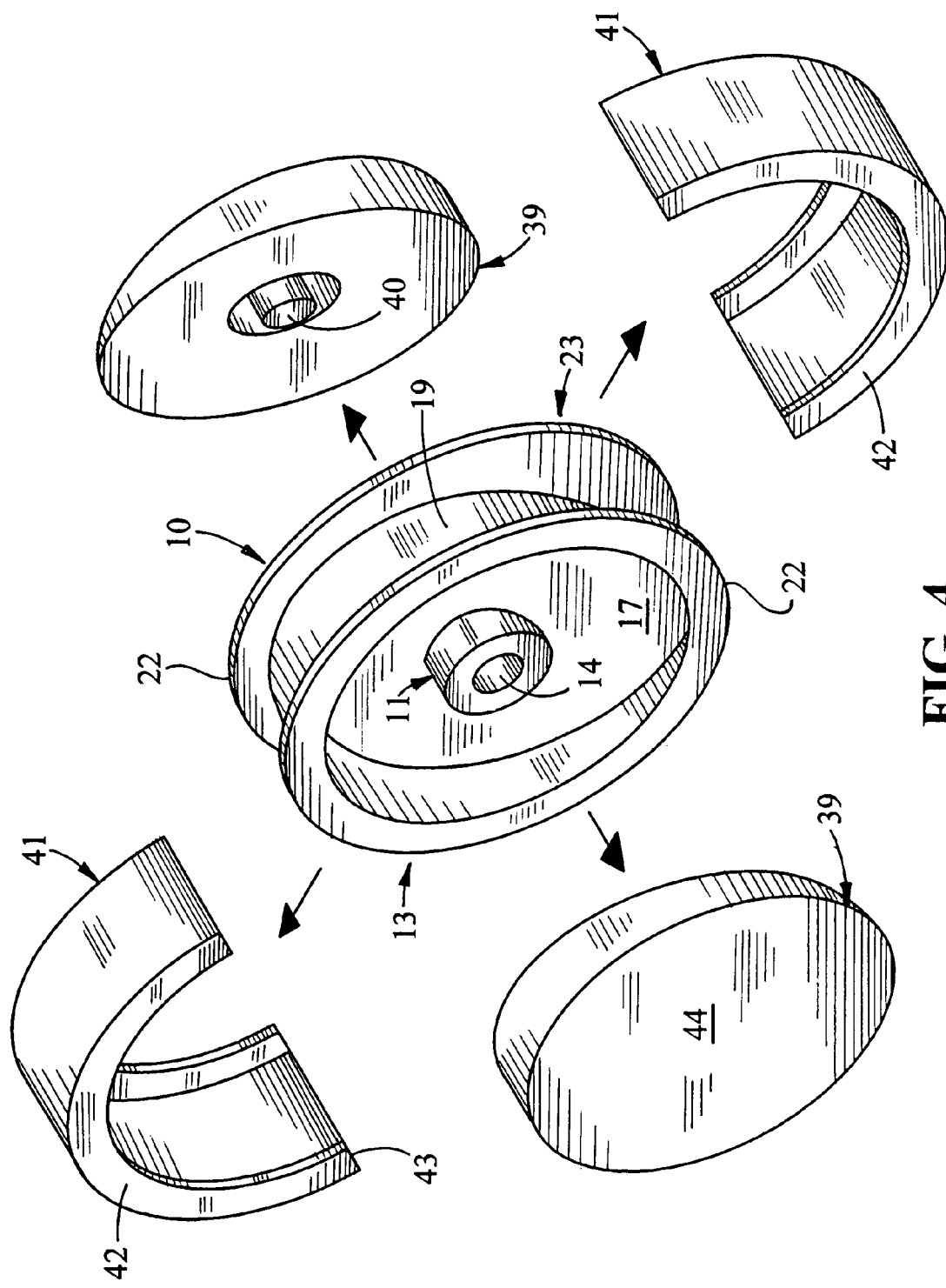
FIG. 4 is a perspective view of the wheel in association with mold components.

An example of a suitable mold apparatus is shown in FIGS. 2, 3 and 4. The exemplified mold apparatus is comprised of paired side inserts 39 adapted to be brought together upon axis 15 so as to define disc member 12 and hub 11. Circular cylindrical posts 40 of inserts 39 are intended to come into abutment so as to define bore 14 and also control the thickness of the resultant disc member 12.

Opposed cup members 41 of the mold apparatus each have spaced apart retaining walls 42 of semi circular configuration terminating in ends 43. A shaping wall 45 extends between said retaining walls. In operation, the paired inserts 39 are brought into contact with proper alignment. The cup members 41 are then brought together so that opposing ends 43 are in abutment and retaining walls 42 embrace portions of outermost faces 44 of inserts 39. Provisions are made by way of standard molding technology for the alignment of the several mold components, introduction of molten metal, cooling, and removal of mold components from the molded wheel. It should be noted that the molding process, with the requisite straight away removal of the mold components is made possible only by virtue of the specialized configuration of the wheel wherein there are no re-entrant structural features in the axial or radial directions of the wheel.

The preferred metal for fabrication of the wheel of this invention is aluminum or aluminum alloys having a melting point below 700 deg. C. The mold components are preferably fabricated of iron or iron alloys, or specialized refractory compositions. The surfaces of the mold components that contact the molten metal during the casting process may be provided with specialized release coatings well known in the art.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A metal wheel of monolithic construction having opposed sides of equal diameter and comprised of:
   a) a hub having a centered axis of rotation, and provided with means for releasible attachment to an axle of a wheeled vehicle,
   b) a disc member extending outwardly from said hub to a substantially circular outer boundary and centered upon a plane which intersects said axis at an angle between 47 and 87 degrees,
   c) a rim member of generally circular configuration centered upon said axis and bounded in part by oppositely spaced apart side panels in substantially orthogonal relationship to said axis and embracing a circular cylindrical interior surface that joins with the outer boundary of said disc member as a continuous integral extension thereof while positioning said outer boundary to associate with said side panels at diametrically opposed distal sites, and an exterior surface surrounding said interior surface and having means for the mounting of a rubber tire, and
   d) a continuously variable balancing zone bounded in part by said interior and exterior surfaces and having a radially measured thickness that progressively varies in the axial direction, the smallest thickness being associated with said distal sites,
   e) said interior and exterior surfaces having linearly translatable configurations without re-entrant features.

2. The wheel of claim 1 wherein said opposed sides are of identical but inverted appearance.

3. The wheel of claim 1 wherein said rubber tire is inflatable.

4. The wheel of claim 1 which is moldable by way of a four component mold.

5. The wheel of claim 1 wherein said releasible attachment means is comprised of a series of axially directed bolt-accommodating bores.

6. The wheel of claim 1 wherein said disc member is bounded in part by opposed surfaces.

7. The wheel of claim 6 wherein said opposed surfaces are each substantially planar.

8. The wheel of claim 1 wherein the width of said rim member measured laterally between said side panels is constant throughout the circular configuration of said wheel.

9. The wheel of claim 1 wherein said means for mounting a rubber tire is comprised of opposed abutment flanges adapted to interact with the bead portion of an inflatable rubber tire.

\* \* \* \* \*